(12) United States Patent
Kodukula et al.

(10) Patent No.: US 6,177,872 B1
(45) Date of Patent: Jan. 23, 2001

(54) DISTRIBUTED IMPEDANCE MATCHING CIRCUIT FOR HIGH REFLECTION COEFFICIENT LOAD

(75) Inventors: Venkata S. Rao Kodukula, Peekskill; Dah-Weih Duan, Yorktown Heights; Michael John Brady, Brewster, all of NY (US)

(73) Assignee: Intermec IP Corp., Woodland Hills, CA (US)

( * ) Notice: Under 35 U.S.C. 154(b), the term of this patent shall be extended for 0 days.

(21) Appl. No.: 09/192,052

(22) Filed: Nov. 13, 1998

Related U.S. Application Data

(60) Provisional application No. 60/078,304, filed on Mar. 17, 1998, provisional application No. 60/078,287, filed on Mar. 17, 1998, and provisional application No. 60/077,879, filed on Mar. 13, 1998.

(51) Int. Cl.⁷ .................................................... G08B 13/14
(52) U.S. Cl. .................................. 340/572.7; 340/572.1; 343/818; 343/711; 343/700 MS; 343/6.8 R; 455/215; 342/44
(58) Field of Search ............................. 340/572.1, 572.7, 340/10.4; 343/818, 711, 700 MS, 6.8 R; 342/44; 455/215

(56) References Cited

U.S. PATENT DOCUMENTS

| 3,914,762 | * | 10/1975 | Klensch | 342/44 |
| 4,068,232 | * | 1/1978 | Meyers et al. | 343/6.8 R |
| 4,075,632 | | 2/1978 | Baldwin et al. | 342/51 |

(List continued on next page.)

FOREIGN PATENT DOCUMENTS

| 0 294 963 | 12/1988 | (EP) . |
| 0 646 983 | 4/1995 | (EP) . |
| WO 98/16070 | 4/1998 | (WO) . |

OTHER PUBLICATIONS

"Multifunction Credit Card Package" IBM Technical Disclosure Bulletin, vol. 38 No. 08, Aug. 1995, p. 17.

"A Low-Power CMOS Integrated Circuit for Field-Powered Radio Frequency Identification Tag" By Friedman et al., 1997 IEEE International Solid State Circuits Conference, Paper SA 17.5, pp. 294, 295, 474.

* cited by examiner

*Primary Examiner*—Benjamin C. Lee
(74) *Attorney, Agent, or Firm*—O'Melveny & Myers LLP

(57) ABSTRACT

An impedance matching circuit in accordance with the principles of the present invention employs series-connected transmission lines to match a high reflection coefficient source impedance with a load impedance. The matching circuit is formed on a dielectric substrate material and accommodates the relatively limited capabilities of photo-lithographic circuit production. The new impedance matching circuit may be constructed of three series-connected transmission line sections. A first section, the section that is to be connected to the source, transforms the high source impedance into a relatively low valued impedance that is substantially resistive. The reflection coefficient of the first section is substantially equal to the reflection coefficient of the source. A second may be implemented as a quarter-wave transformer that transforms the low impedance developed by the first section into an intermediate impedance value. The third section transforms this intermediate value impedance into an impedance that substantially matches that of the load.

15 Claims, 2 Drawing Sheets

U.S. PATENT DOCUMENTS

| | | | | |
|---|---|---|---|---|
| 4,326,203 | * | 4/1982 | Kaloi | 343/700 MS |
| 4,360,810 | | 11/1982 | Landt | 342/44 |
| 4,782,345 | | 11/1988 | Landt | 343/727 |
| 4,786,907 | | 11/1988 | Koelle | 342/51 |
| 4,816,389 | | 3/1989 | Sansonetti et al. | 435/6 |
| 4,835,377 | | 5/1989 | Brown | 235/492 |
| 4,853,705 | | 8/1989 | Landt | 343/803 |
| 4,864,158 | | 9/1989 | Koelle et al. | 327/31 |
| 4,888,591 | | 12/1989 | Landt et al. | 342/44 |
| 4,999,636 | | 3/1991 | Landt et al. | 342/90 |
| 5,030,807 | | 7/1991 | Landt et al. | 235/375 |
| 5,055,659 | | 10/1991 | Hendrick et al. | 340/10.51 |
| 5,479,160 | | 12/1995 | Koelle | 340/825.7 |
| 5,485,520 | | 1/1996 | Chaum et al. | 705/74 |
| 5,504,485 | | 4/1996 | Landt et al. | 342/42 |
| 5,510,795 | | 4/1996 | Koelle | 342/114 |
| 5,521,601 | | 5/1996 | Kandlur et al. | 342/44 |
| 5,528,222 | | 6/1996 | Moskowitz et al. | 340/572.7 |
| 5,538,803 | | 7/1996 | Gambino et al. | 428/694 TM |
| 5,550,547 | | 8/1996 | Chan et al. | 342/42 |
| 5,552,778 | | 9/1996 | Schrott et al. | 340/875.34 |
| 5,554,974 | | 9/1996 | Brady et al. | 340/572.6 |
| 5,563,583 | | 10/1996 | Brady et al. | 340/572.2 |
| 5,565,847 | | 10/1996 | Gambino et al. | 340/572.6 |
| 5,606,323 | | 2/1997 | Heinrich et al. | 340/10.34 |
| 5,630,216 | * | 5/1997 | McEwan | 455/215 |
| 5,635,693 | | 6/1997 | Benson et al. | 340/10.33 |
| 5,673,037 | | 9/1997 | Cesar et al. | 340/10.32 |
| 5,680,106 | | 10/1997 | Schrott et al. | 340/10.33 |
| 5,682,143 | | 10/1997 | Brady et al. | 340/572.7 |
| 5,686,928 | * | 11/1997 | Pritchett et al. | 343/711 |
| 5,729,201 | | 3/1998 | Jahnes et al. | 340/572.1 |
| 5,729,697 | | 3/1998 | Schkolnick et al. | 705/23 |
| 5,736,929 | | 4/1998 | Schrott et al. | 340/572.1 |
| 5,737,710 | | 4/1998 | Anthonyson | 701/1 |
| 5,739,754 | | 4/1998 | Schrott et al. | 340/572.2 |
| 5,767,789 | | 6/1998 | Afzali-Ardakani et al. | 340/10.1 |
| 5,771,021 | | 6/1998 | Veghte et al. | 343/700 MS |
| 5,777,561 | | 7/1998 | Chieu et al. | 340/10.32 |
| 5,786,626 | | 7/1998 | Brady et al. | 257/673 |
| 5,812,065 | | 9/1998 | Schrott et al. | 340/10.34 |
| 5,821,859 | | 10/1998 | Schrott et al. | 340/572.6 |
| 5,825,329 | | 10/1998 | Veghte et al. | 343/700 MS |
| 5,826,328 | | 10/1998 | Brady et al. | 29/827 |
| 5,828,318 | | 10/1998 | Cesar | 340/825.69 |
| 5,828,693 | | 10/1998 | Mays et al. | 375/136 |
| 5,831,532 | | 11/1998 | Gambino et al. | 340/572.1 |
| 5,850,181 | | 12/1998 | Heinrich et al. | 340/572.1 |
| 5,850,187 | | 12/1998 | Carrender et al. | 340/10.6 |
| 5,874,902 | | 2/1999 | Heinrich et al. | 340/10.51 |
| 5,926,093 | * | 7/1999 | Bowers et al. | 340/572.1 |
| 6,028,564 | * | 2/2000 | Duan et al. | 343/818 |
| 6,046,668 | * | 4/2000 | Forster | 340/10.4 |

DISTRIBUTED IMPEDANCE MATCHING CIRCUIT FOR HIGH REFLECTION COEFFICIENT LOAD

This application claims priority from provisional applications No. 60/078,304 and 60/078,287 both filed on Mar. 17, 1998 and 60/077,879 filed on Mar. 13, 1998.

FIELD OF THE INVENTION

The invention relates to impedance matching networks, and, more particularly, to impedance matching networks for circuits connected to loads with high reflection coefficients.

BACKGROUND OF THE INVENTION

In order to reduce reflections, improve signal quality, and supply the greatest power from a source to a load, the impedance "looking into the load" from the source should match the output impedance of the source. Additionally, since a mismatched line has different properties at different frequencies, a mismatched circuit is generally unsuitable for broadband or multi-frequency use. Consequently, relatively broadband circuit applications are particularly needful of impedance matching circuits.

Impedance matching is discussed in The Art of Electronics, Paul Horowittz and Winfield Hill, Cambridge University Press, Second Edition, New York, 1989 pp. 879–882 and in R. E. Collin, "Foundations For Microwave Engineering", McGraw-Hill, 1992.

Matching the impedance of a load having a high reflection coefficient is particularly difficult, sometimes requiring complex circuits that are particularly difficult to implement using conventional technologies. For example, in order to produce a matching circuit having the appropriate impedance, a conductor line on a printed circuit board may need to be thinner than may be accommodated by conventional photoligthographic techniques. The term, "a load having a high reflection coefficient" refers to a load that has a high reflection coefficient with respect to a conventional fifty-ohm system impedance. Additionally, the terms load and source may be interchanged, depending upon one's perspective so that, for example, an antenna and an RF tag circuit may be respectively viewed as source and load, or load and source, depending upon perspective. Related applications and issued patents Related U.S. Patents assigned to the assignee of the present invention include: U.S. Pat. Nos. 5,528,222; 5,550,547; 5,552,778; 5,554,974; 5,538,803; 5,563,583; 5,565,847; 5,606,323; 5,521,601; 5,635,693; 5,673,037; 5,682,143; 5,680,106; 5,729,201; 5,729,697; 5,736,929; 5,739,754; and 5,767,789. Patent applications assigned to the assignee of the present invention include: application U.S. Pat. No. 5,673,037; Ser. No. 08/621,784, filed on Mar. 25, 1996 entitled, "Thin Radio Frequency Transponder with Leadframe Antenna Structure" by Brady et al. (pending); application Ser. No. 08/626,820, Filed: Apr. 3, 1996, entitled, "Method of Transporting RF Power to Energize Radio Frequency Transponders", by Heinrich et al.; application Ser. No. 08/694,606 filed Aug. 9, 1996 entitled, "RFID System with Write Broadcast Capability" by Heinrich et al.; application Ser. No. 08/681,741, filed Jul. 29, 1996 entitled, "RFID Transponder with Electronic Circuit Enabling and Disabling Capability", by Heinrich et al.; application Ser. No. 08/592,250 (See also PCT International Application No. PCT/EP95/03903 filed Sep. 20, 1995, and U.S. application Ser. No. 08/330,288 filed Oct. 27, 1994, now abandoned, on which the PCT application is based); U.S. Pat. No. 5,729,201; application Ser. No. 08/909,719; application Ser. No. 08/621,784; application Ser. No. 08/660,249; application Ser. No. 08/660,261; application Ser. No. 08/790,640; application Ser. No. 08/790,639; and application Ser. No. 08/681,742. The above identified U.S. Patents and U.S. Patent applications are hereby incorporated by reference. Additionally, Patent Applications entitled, "Radio Frequency Identification Transponder Having a Spiral Antenna", "Radio Frequency Identification Transponder Having a Helical Antenna", "RFID Transponder Having Improved RF Characteristics", and "Radio Frequency Identification Transponder Employing a Patch Antenna", filed on the same day as this application and assigned to the same assignees as this application is assigned are also hereby incorporated by reference.

The applicants claim priority under 35 U.S.C. 119 (e) for provisional applications having attorney docket numbers YO897 660P1, YO897-661P1, and YO997-038P1, respectively filed on March 16, 17, and 13.

SUMMARY

An impedance matching circuit in accordance with the principles of the present invention employs series-connected transmission lines, such as microstrip lines, to match a high reflection coefficient source impedance, such as that associated with RF tag circuitry, with a load impedance such as that associated with an antenna input. The matching circuit is formed on a substrate material and accommodates the relatively limited capabilities of lithographic circuit formation techniques. The terms load and source may be interchanged, depending upon one's perspective so that, for example, an antenna and an RF tag circuit may be respectively viewed as source and load, or load and source, depending upon perspective.

In an illustrative embodiment the new impedance matching circuit may be constructed of three series-connected transmission line sections. A first section, the section that is to be connected to the source, transforms the high source impedance into a relatively low-valued impedance that is substantially resistive. Additionally, the reflection coefficient looking into the source from one end of the first section is substantially equal to the reflection coefficient looking into the source from the other end of the first section. The reflection coefficient looking into the source from a first end of the first section, at the source/first section interface, is given, for example, by a ratio of differences and sums of the impedances of the first section and of the source. Similarly, the reflection coefficient looking into the source from second end of the first section is given by the ratio of the differences and sums of the source impedance as transformed to the second end of the first section and the characteristic impedance of the first section.

A second section of the illustrative three-section embodiment is a quarter wave transformer that transforms the low impedance developed by the first section into an intermediate impedance value. The third section transforms this intermediate value impedance into an impedance that substantially matches that of the load.

The second section may be transformed to any of a number of values, but, perhaps most conveniently, if the second section transforms the input impedance looking into the source into a 50 ohm impedance and the load is a 50 ohm impedance, the third section may be a transmission line of any length having an intrinsic impedance of 50 ohms. Consequently, in this case, the matching circuit affords some latitude in the selection of the third section's length because the third section may be made of such a length as minimizes interference between the second section and the load. Similarly, with higher-impedance loads, within the 50 to 800 ohm range corresponding to a wide variety of antenna impedances, for example, the length of the third section may be chosen to suit a wide range of impedances. As a result, a single impedance matching circuit design may be employed to match a source to a variety of loads, thus reducing the manufacturing costs of devices that employ the new matching circuit.

Although the new impedance matching circuit may be employed with a variety of sources and loads, it is particularly well suited to application with RFID tags.

In a further aspect of the invention, a free standing quarter wave transformer is employed to couple one terminal of the RFID circuitry to a ground plane on the opposite side of the substrate from the RFID circuitry. By employing the quarter wave transformer, a via-free connection is made between the circuitry on one side of the substrate and a ground plane on the other side. This via-free connection improves mechanical reliability and reduces manufacturing costs.

BRIEF DESCRIPTION OF THE DRAWINGS

The above and further features, aspects, and advantages of the invention will be apparent to those skilled in the art from the following detailed description, taken together with the accompanying drawings in which.

DETAILED DESCRIPTION

An impedance matching circuit employs series connected transmission lines to match a source impedance that exhibits a relatively high reflection coefficient (with respect to a conventional fifty-ohm system impedance) to a load impedance. As illustrated in the block diagram of FIG. 1, a source impedance 100 is connected through a series combination of transmission line sections 102 to a load impedance 104. The impedance matching circuit 102 is composed of a plurality of transmission line sections, any of which may be implemented using a variety of materials. That is, each of the transmission line sections is made up of a pair of conductors separated by a dielectric material and may be implemented using hybrid technology, printed circuit board technology, or other known technologies. A dielectric substrate material such as a glass/epoxy board, a ceramic substrate, tile substrate materials, a flexible substrate material, or other materials, may be employed in conjunction with printed circuit traces, i.e., conductive material such as copper deposited and etched or silver conducting paste screened to form conductive lines, or traces, on either side of the substrate material to form the desired transmission line sections.

Figure 1:
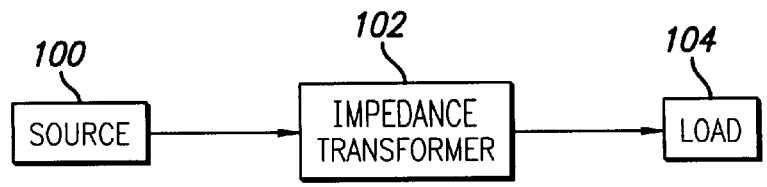
FIG. 1 is a conceptual block diagram of a system, which includes a source, a load, and a matching circuit in accordance with the principles of the invention.
Figure 2A:
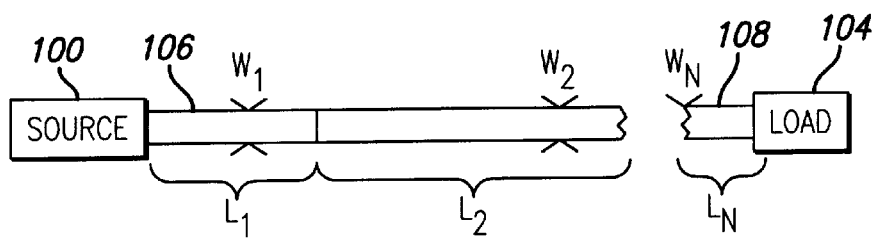
FIGS. 2A and 2B are circuit diagrams illustrating a multisection series connected matching circuit in accordance with the principles of the present invention.

In the circuit diagram of FIG. 2A the source impedance 100 and load impedance 104 are illustrated, as in FIG. 1, as functional blocks. The impedance matching circuit 102 includes a first transmission line section 106 that is connected in series to another transmission line section 108. The entire impedance matching circuit 102, including at least two transmission line sections, is connected in series between the source 100 and load impedance 104. Each section may be characterized by a length Ln and width Wn. The width Wn, together with the dielectric constant and thickness of the transmission lines' substrate material, determines each transmission line section's characteristic impedance $Z_o$. The characteristic impedance is related to the board thickness and its dielectric constant and the line width in a known manner. One expression of the relationship is available in Table 2.6 of, "Microwave Solid State Circuit Design", Inder Bahl, and Prakash Bhartia, John Wiley and Sons, New York, 1988 which is hereby incorporated by reference. In the illustrative embodiment, a transmission line section 106 is connected to the source 100. This transmission line section transforms the relatively high reflection coefficient impedance of the source into a low valued, substantially pure resistance. That is, "looking back into" the source, the impedance with the first section 106 attached is a low-valued substantially pure resistance, whereas, without the first section 106 attached, the impedance looking back into the source has a high reflection coefficient. One or more transmission line sections 108 are connected to the transmission line section 106 to transform the relatively low valued substantially pure resistance afforded by the first transmission line section into an impedance which matches that of the load impedance 104.

Figure 2B:
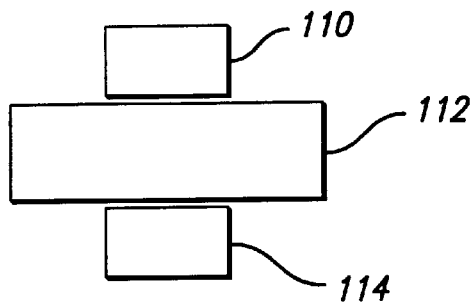

A transmission line section, as may be employed to transform an impedance in accordance with the principles of the present invention is illustrated in greater detail in the perspective view of FIG. 2B. A conductive trace 110, which will be referred to for the convenience of description as a top trace, although the traces and substrate may be held in any orientation, is attached to a substrate 112 formed of a dielectric material. A bottom trace 114 is attached to the substrate directly opposite the top trace. The bottom trace 114 may match the outline of the top trace, in which case the bottom and top traces are generally referred to as a parallel plane transmission line, or the bottom trace 114 may be implemented as a ground plane, whereby the entire side of the substrate opposite to that of the top trace is covered by a conductive material. In the latter case, the line is generally referred to as a microstrip line. As noted above, the dielectric material 102 may be formed of any number of materials.

Figure 3:
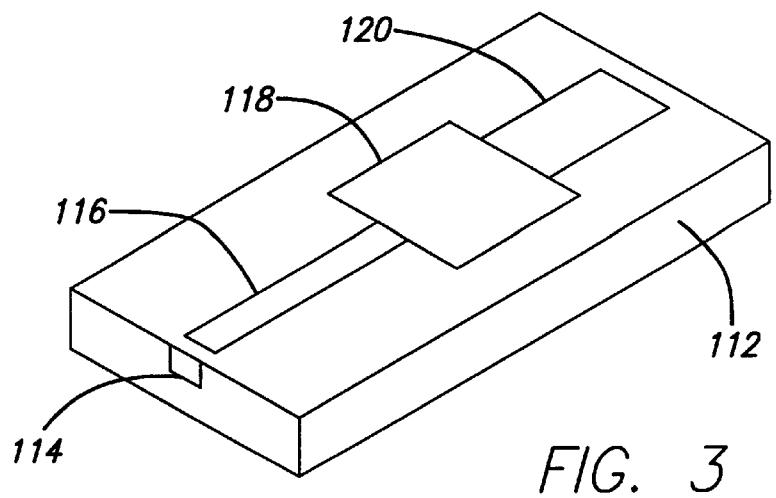
FIG. 3 is a circuit diagram of a three-section matching circuit in accordance with the principles of the present invention.

An illustrative embodiment of a three-section impedance matching circuit in accordance with the principles of the present invention will be described in association with the circuit diagram of FIG. 3. FIG. 3 is a top-plan view of an illustrative three section embodiment of an impedance matching circuit in accordance with the principles of the present invention. A first transmission line section 116 is connected to a source (not shown) which exhibits a complex impedance $Z_c$ having respectively low and high, real and imaginary parts. Source impedances having a low real part, on the order of 10 ohms, and relatively high imaginary parts, which may range up to several hundred ohms, are particularly difficult impedances to which to match a load impedance. To properly match impedances in this case, that is, to extract the maximum power from the source, the load impedance should have an impedance that is the complex conjugate of the source impedance.

Although it is conceivable that one could use a single transmission line section to match the load impedance to the source impedance by transforming the load impedance to either a very high resistance or to a very low resistance, neither approach is particularly practical. That is, to obtain a high enough resistance for the first approach, some portion of a line in the circuit would have to be so narrow as to be impractical. For example, current printed circuit techniques limit the width of a micro strip line to no less than 4 mils. The width of the line would be impractical, not only because of the special photolithographic techniques that would be required, with their attendant costs, but slight variations in the line's width could result in significant performance variations. On the other hand, a single micro strip line wide enough to reduce the load impedance to a very low resistance would be so wide as to disturb operation of the load in some cases. For example a continuously tapered line that is very wide at a low impedance end and narrow at a high impedance end, may have to be so wide at the low impedance end as to present interference to other circuit components and it may radiate a significant amount of energy, rather than guiding the energy through the circuit as intended. Additionally, the narrow end may have to be so narrow as to preclude manufacture by conventional printed circuit board techniques, and, as noted above, any small absolute variations in the width would result in large percentage variations of the high impedance end. Consequently, the illustrative embodiment of FIG. 3 employs three transmission line sections (micro strip in the illustrative embodiment here) to transform the source impedance into an impedance which matches the load. This matching process can be viewed from the perspective of "looking into" the source, or, equivalently, it can be viewed from the perspective of looking into the load.

From the perspective of looking into the source, the first section 116 transforms the low-resistance/high-reactance impedance of the source into a low valued resistance. The magnitude of the reflection coefficient of the first section/source combination is substantially equal to the magnitude of source's reflection coefficient. A second section 118 transforms the impedance looking into the second section into an intermediate valued resistance. In the illustrative embodiment, the second section 118 is implemented as a quarter wave transformer to simplify the impedance matching circuit. A third section 120 transforms the intermediate valued resistance of the second section into a resistance which matches the load. Through use of a second section 118 that produces an intermediate-valued resistance, the third section 120 may be implemented with an impedance that does not require an extremely thin transmission line profile. That is, the impedance of the third section 120 need not be so high as to require special photolithographic techniques and, consequently, the cost and reliability of the matching circuit will be substantially improved when compared to a matching circuit that employs the very narrow transmission lines necessary to produce high impedances.

From the perspective of looking into the load, the third section 120 transforms the load impedance into an intermediate impedance, the second section 118 transforms this impedance into a relatively low resistance (on the order of ten ohms or less), and the first section 116 transforms the load resistance of the second section to the complex conjugate of the source impedance.

Figure 4:
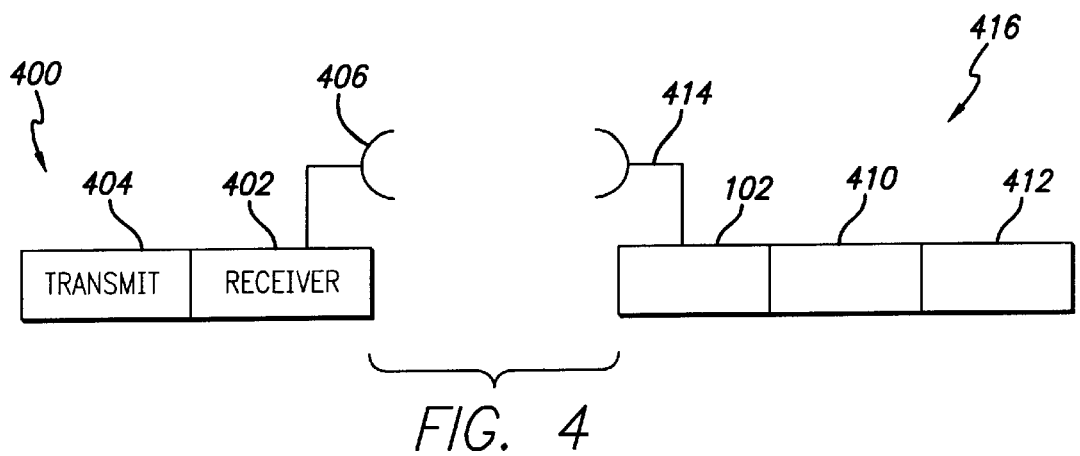
FIG. 4 is a conceptual block diagram of an RFID system that employs an impedance matching circuit in accordance with the principles of the present invention.

An RFID system in accordance with the principles of the present invention is illustrated in the conceptual block diagram of FIG. 4. An RF base station 400 includes an RF transmitter 402, an RF receiver 404, and an antenna 406 connected to the transmitter 402 and receiver 404. An RF tag 416 such as may be used in conjunction with the base station 400 includes an RF front end 410, a signal processing section 412, and an antenna 414 which provides operation over a relatively wide frequency band. The tag 416 also includes a multi-section series-connected impedance matching circuit 102 in accordance with the principles of the present invention.

In operation, the base station 400 interrogates the tag 416 by generating an RF signal having a carrier frequency $f_c$. The carrier frequency $f_c$ is chosen based on a number of factors known in the art, including the amount power permitted at that frequency by FCC regulations. The RF signal is coupled to the antenna 406 and transmitted to the tag 416. The RF signal emitted by the antenna 406 will, ostensibly, be received by the tag antenna 414. If the RF signal's field strength meets a read threshold requirement, the RF tag will respond to the reception of the signal by modulating the RF carrier to impart information about the associated container onto the back-scattered RF field which propagates to the base station 400. The RF signal transmitted by the base station 400 must have sufficient field strength, taking into account the polarization of the signal and of the tag's antenna, at the location of the tag 416 for the tag to detect the RF signal. In the case of a field-powered passive tag, the interrogating signal's field strength generally must be great enough for the tag 416 to rectify the signal and to use the signal's energy as the tag's power source. It should be clear that, in applications such as this, with very little power available to the circuit, an impedance matching circuit that maximizes the power delivery from a source to a load is particularly advantageous.

Figure 5A:
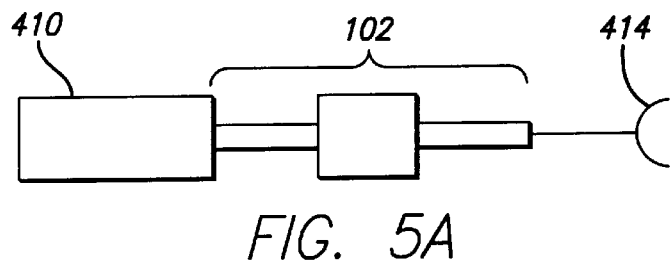
FIGS. 5A and 5B are circuit diagrams of an RFID tag that employs an impedance matching circuit in accordance with the principles of the present invention.
Figure 5B:
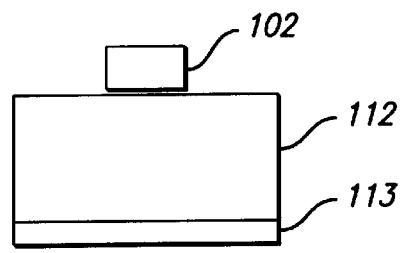

In the top plan view of the RFID tag of FIG. 5A, a high reflection coefficient source, in the form of RFID circuitry, is connected through a three-section matching circuit 102 to a resistive load in the form of an antenna. The elevation view of FIG. 5B displays the orientation of the RFID circuitry, matching circuit, etc., on a substrate material having a given thickness and dielectric constant. On the opposite side of the substrate, a ground plane underlies the above-mentioned circuitry to form the transmission lines, or more specifically in this case, microstrip lines, of the matching circuit. Additionally, the ground plane 113 provides an electrical reference for the RFID circuitry.

A transmission line's impedance transformation properties may be generally described by the following formula;

$$Z_{in}=Z_C(Z_L+jZ_C \tan (\beta L))/(Z_C+jZ_L \tan (\beta L)) \tag{1}$$

where:
 $Z_{in}$=the input impedance looking into a load attached to the opposite end of the transmission line,
 $Z_c$=the characteristic impedance of the transmission line,
 $Z_L$=the load impedance,
 L=the length of the transmission line,
 $\beta=2\pi/$(guided wavelength), is the propagation constant of the transmission line.
In the special case where the length of the transmission line equals one quarter of the guided wavelength, the transmission line is referred to as a quarter wave transformer and the relationship reduces to:

$$Z_{in}=Z_C^2/Z_L \tag{2}$$

Assuming the thickness and dielectric constant of the substrate are given, the characteristic impedance of a transmission line section is a function of the section's width Wn. Common board thicknesses include 3-, 5-, 8-, 10-, 16-, 20-, 30-, 40-mil, etc. and common relative dielectric constants include 2.5, 3.0, 3.2, 3.4, 4.0, 4.5, 6.0, 9.2, 10.2, 20, etc. In the following example, a relative dielectric constant of 3.0 and a board thickness of 30 mil are assumed. The characteristic impedance may be derived, for example, from the previously mentioned table 2.6 of the Bahl reference. For a source impedance such as 10−j100 ohms provided by an RFID integrated circuit, one might set the characteristic impedance of the first section to 50 ohms. In a case where the second section 118 and third section 120 are used to transform a low-valued resistance to a high impedance, the intermediate impedance is the geometrical mean of the low-valued resistance and high impedance. For example, if the low-valued resistance is 3 ohms and the high impedance is 800 ohms, the intermediate impedance is 49 ohms, very close to 50 ohms. The line thickness $w_1$, 1.88 mm, may be obtained, for example, from equations listed in table 2.6 of the Bahl reference. As is known, the impedance of a microstrip line may be most accurately calculated by a full-wave solution of Maxwell's equations. The Bahl reference provides formulas that have been generated by curve-fitting the full-wave solutions. Given a load impedance equal to 10−j100 ohms (this load impedance is actually the impedance of the source, the RFID circuit), and the requirement that the impedance looking into the first section be a real number, $\beta L_1 = 63.6°$. Since the guided wavelength is known, the length $L_1$ can be computed using one of the Bahl relationships to yield $L_1 = 14$ mm (63.6 electrical degrees) assuming a guided wavelength of 78.73 mm for the 1.88 mm line at 2.45 GHz. Inserting the above values into equation 1 yields an impedance of approximately 2 ohms, looking into the RFID circuitry from the transmission line.

The second section is designed to transform this two ohm impedance into a convenient intermediate valued impedance. A value of 50 ohms for the intermediate impedance is particularly convenient, as a number of antennas present a 50 ohm load. In the illustrative embodiment, this section is implemented using a quarter wave transformer and thus the characteristic impedance of section 2 is given, from equation 2 as:

$$Z_c = \sqrt{(Z_{in} Z_l)} \quad (3)$$

Thus the characteristic impedance for the second section is 10 ohms. The length $L_2$ of the second section is given by the fact that this is a quarter wave transformer. The length and width of section can be readily computed, yielding W2=14.64 mm in order to produce a 10 ohm impedance. Because the guided wavelength of this line at 2.45 GHz is 73.3 mm, L2 is 18.32 mm.

The third transmission section matches the input impedance looking into the second section, 50 ohms in this example, to the impedance of the attached antenna. If the antenna impedance is greater than the impedance looking into section two, section three can be implemented as quarter wave transformer, having a length $L_3$ determined by the requirement that it be a quarter wave transformer. The section's characteristic impedance 141 ohms, assuming a 400 ohm load, is 141 ohms. The width $W_3$ of section 3, is 0.177, and the guided wavelength of line 3 is 83.07 mm. The length of line 3 is one quarter of the guided wavelength, or 20.77 mm.

Using this illustrative embodiment, one may choose the impedance of line 3 to match the average impedance of a group of relatively high impedance antennas that may be connected to the circuit. That is, a single RFID circuit/three section matching circuit combination may be designed for use with a plurality of antennas having a relatively broad range of impedances. For example, an antenna having a impedance 800−j100 ohms will be transformed to 49.2+j6.2 ohms using a 200 ohm quarter wave transformer for section 3. If the antenna impedance is 600−j100 ohms, the same 200 ohm quarter wave transformer for section 3 will transform the antenna impedance to 67 ohms. The 67 ohms is transformed to 1.5 ohms by section 2's 10 ohm impedance and to 7.5+j99.6 ohms by section's 1 50 ohm 63.6°. This value is very close to the value (10 plus j100 ohms) obtained using the same impedance matching circuit values, but with antenna impedance of 800 ohms. Since most antennas present impedances in the range from 50–300 ohms (300–600 ohms for some higher impedance antennas), the illustrative 3 section matching circuit is particularly suitable to matching antenna impedances to relatively high impedance, high reflection coefficient circuits, such as RFID circuits.

In this illustrative embodiment, bandwidth has been, to some extent, traded for space. That is, by using a quarter wave transformer, the bandwidth of the circuit will be limited somewhat limited in comparison to a continuously tapered line. However, as previously discussed, the continuously tapered line would pose difficulties, at both its high- and low-impedance ends and would typically consume more surface area than the illustrative three-line embodiment. The illustrative three-section, or three-line, embodiment provides an intermediate bandwidth, between that of a single tier transformer and that of a continuously tapered line.

In a special case where the second section has transformed the impedances looking into the source to an impedance equal to the antenna impedance, the third section may have a width that yields an intrinsic impedance $Z_c$ equal to the antenna impedance. In this case, the length of the third section may be of an arbitrary length and should be chosen to eliminate interference between the relatively wide section 2 and the antenna. Since many antennas are designed with a 50 ohm impedance, a third section of arbitrary length having a 50 ohm intrinsic impedance would be particularly well suited for a wide variety of RFID tag applications.

Figure 6:
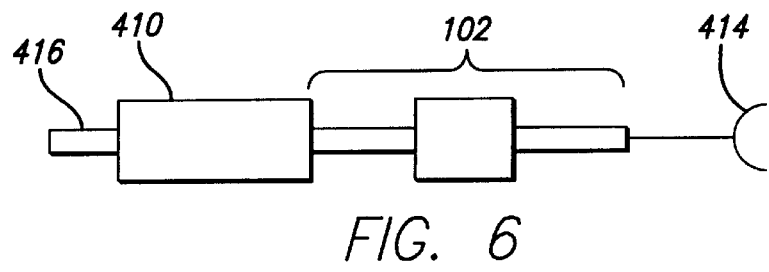
FIG. 6 is a circuit diagram of an RFID tag that employs a "via free" ground connection in accordance with the principles of the present invention.

In the illustrative embodiment of FIG. 6, the RFID circuitry is typically connected at one terminal through the impedance matching circuit 102 to an antenna. Another terminal of the RFID circuit, one which provides an electrical reference point, or "ground" is connected to a quarter wave transformer formed by an open-ended microstrip line situated opposite the ground plane. The quarter wave transformer acts as an RF short to the ground plane, thus providing an electrical reference for the circuit without requiring the use of a via through the substrate material. That is, with $Z_1$=infinity, and $(\beta L)=(\pi/2)$, $Z_{in}=0$, as indicated by equation 1. This via-free connection to the ground plane eliminates substantial manufacturing costs and improves the reliability of the RFID tag circuitry. The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. An RFID tag comprising:
   an RFID circuit,
   an antenna, and
   a series connected transmission line impedance transforming circuit connected between the RFID circuit and the antenna to match the impedance of the RFID circuitry to the impedance of the antenna, wherein the impedance transforming circuit includes a first transmission line connected to the RFID circuit, the first transmission line transforming the relatively high impedance of the RFID circuit into an impedance that is a substantially pure resistance and that has a reflection coefficient whose magnitude is substantially the same as the reflection coefficient of the source, and one or more series-connected transmission line(s) connected to the first transmission line, said one or more series-connected transmission line(s) transforming the relatively low valued substantially pure resistivity looking into the first transmission line into an impedance which matches the impedance of the load.

2. The RFID tag of claim 1 wherein each transmission line comprises:
   a dielectric substrate,
   a first conductive trace affixed to one side of the substrate, and
   a second conductive trace affixed to the opposite side of the dielectric substrate.

3. The RFID tag of claim 2 wherein the transmission lines comprise conductive traces photolithographically applied to a printed circuit board.

4. An RFID tag comprising:
   an RFID circuit;
   an antenna, and
   a series connected transmission line impedance transforming circuit connected between the RFID circuit and the antenna to match the impedance of the RFID circuitry to the impedance of the antenna, wherein the impedance transforming circuit includes a first transmission line for connection to the source, the line having an impedance that transforms the RFID circuit impedance into a small-valued, substantially pure resistance, a second transmission line connected in series to the first transmission line, the second transmission line having an impedance that transforms the input impedance looking into the first transmission line when the first transmission line is connected to the RFID circuit into an intermediate-valued impedance, and, a third transmission line that transforms the intermediate-valued impedance looking into the second transmission line into an impedance that substantially matches the impedance of the antenna.

5. The RFID tag of claim 4 wherein the second transmission line is a quarter wave transformer.

6. The RFID tag of claim 4 wherein the second transmission line provides an impedance, looking into the second line when connected to the first line, which permits the third line to be produced using standard photolithographic processes to match the impedance of the antenna.

7. An RFID tag comprising:
   a source;
   a load; and
   a series connected transmission line impedance transforming circuit connected between the source and the load to match the impedance of the source to the impedance of the load, wherein said impedance transforming circuit includes first and second series-connected transmission line sections, said first transmission line section connected to said source and transforming the impedance of the source into a substantially sure resistive value, and said second transmission line section connected to said load and transforming said substantially pure resistive value looking into said first transmission line section into an impedance that matches the impedance of said load.

8. An RFID tag comprising:
   RFID circuitry,
   an antenna,
   a series connected transmission line impedance transforming circuit connected between the RFID circuitry and the antenna to match the impedance of the RFID circuitry to the impedance of the antenna, and
   a via-free connection between a circuit point on one side of a printed circuit board to a reference point on the other side of the printed circuit board, comprising:
   a quarter wave transformer connected to the circuit point on one side of a printed circuit board, and
   a conductive trace on the opposite side of the printed circuit board from the quarter wave transformer, underlying the quarter wave transformer and substantially encompassing the outline of the quarter wave transformer.

9. The RFID tag of claim 8 wherein the impedance transforming circuit for connection between a antenna and a high reflection coefficient RFID circuit, comprises:
   a first transmission line connected to the RFID circuit, the first transmission line transforming the impedance of the RFID circuit into an impedance that is a substantially pure resistance and that has a reflection coefficient whose magnitude is substantially the same as the reflection coefficient of the source, and one or more series-connected transmission line(s) connected to the first transmission line, said one or more series-connected transmission line(s) transforming the relatively low valued substantially pure resistivity looking into the first transmission line into an impedance which matches the impedance of the load.

10. The RFID tag of claim 9 wherein each transmission line comprises:
    a dielectric substrate,
    a first conductive trace affixed to one side of the substrate, and
    a second conductive trace affixed to the opposite side of the dielectric substrate.

11. The RFID tag of claim 10 wherein the transmission lines comprise conductive traces photolithographically applied to a printed circuit board.

12. The RFID tag of claim 8 wherein the impedance transforming circuit comprises:
    a first transmission line for connection to the source, the line having an impedance that transforms the RFID circuit impedance into a small-valued, substantially pure resistance,
    a second transmission line connected in series to the first transmission line, the second transmission line having an impedance that transforms the input impedance looking into the first transmission line when the first transmission line is connected to the RFID circuit into an intermediate-valued impedance, and, a third transmission line that transforms the intermediate-valued impedance looking into the second transmission line into an impedance that substantially matches the impedance of the antenna.

13. The RFID tag of claim 12 wherein the second transmission line is a quarter wave transformer.

14. The RFID tag of claim 13 wherein the second transmission line provides an impedance, looking into the second line when connected to the first line, which permits the third line to be produced using standard photolithographic processes to match the impedance of the antenna.

15. The RFID tag of claim 14 wherein the third section is of arbitrary length.

* * * * *